UNITED STATES PATENT OFFICE.

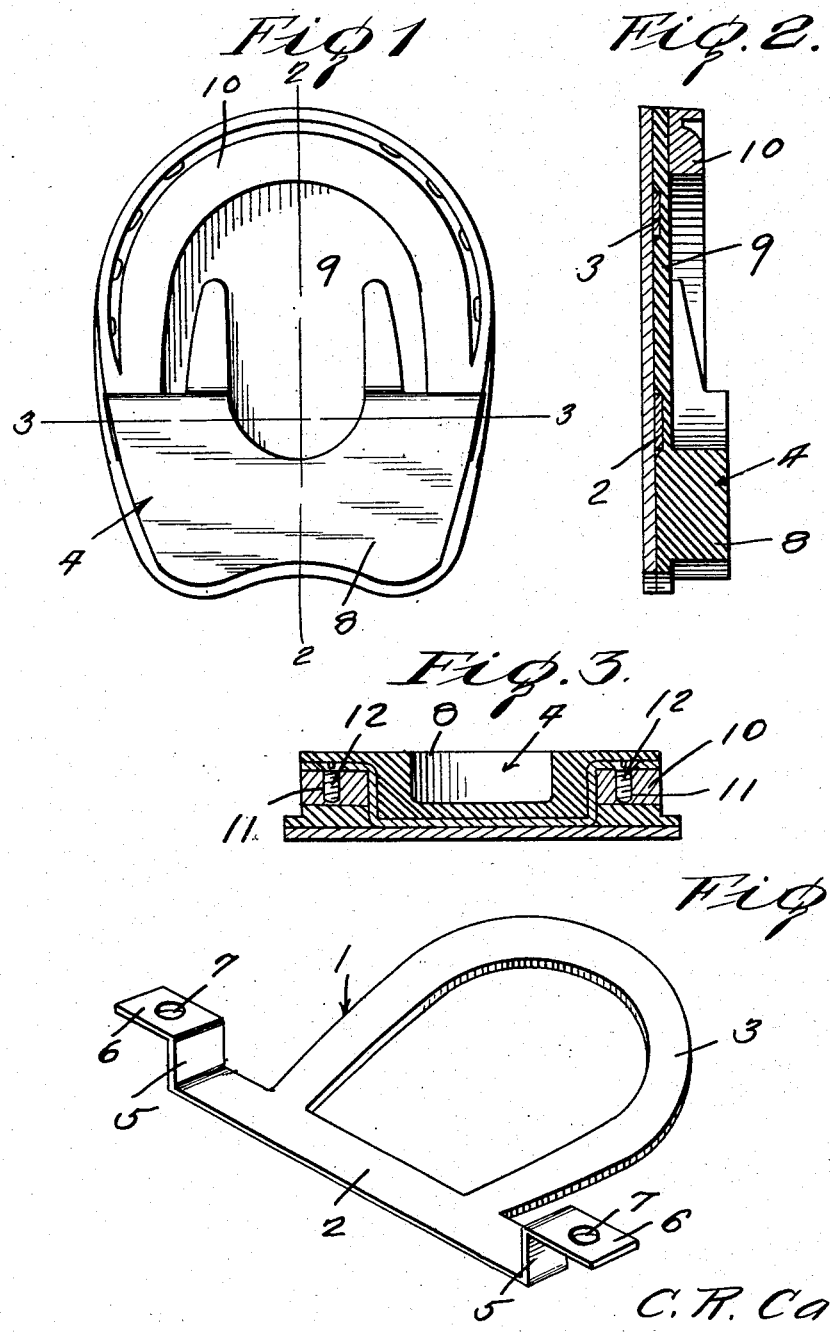

CHARLES R. CARR, OF ORANGE, NEW JERSEY.

HORSESHOE-PAD.

1,175,235.  Specification of Letters Patent.  Patented Mar. 14, 1916.

Application filed August 6, 1915. Serial No. 44,070.

*To all whom it may concern:*

Be it known that I, CHARLES R. CARR, a subject of the King of Great Britain, residing at Orange, in the county of Essex, State of New Jersey, have invented certain new and useful Improvements in Horseshoe-Pads; and I do hereby declare the following to be a full, clear, and exact description of the invention, such as will enable others skilled in the art to which it appertains to make and use the same.

The present invention is directed to improvements in horseshoe pads, and has for its object to so construct an article of this character which can be easily and quickly applied to the shoe, or removed therefrom.

A further object of the invention is to provide a pad of this character, which is extremely simple in construction, durable, inexpensive in structure, and one which when applied to the shoe will effectually cushion the foot of the horse when traveling over hard roadways or pavements.

With these and other objects in view, this invention resides in the novel features of construction, formation, combination, and arrangement of parts to be hereinafter more fully described, claimed and illustrated in the accompanying drawing, in which:—

Figure 1 is a bottom plan view of the device. Fig. 2 is a sectional view on line 2—2 of Fig. 1. Fig. 3 is a similar view on line 3—3 of Fig. 1. Fig. 4 is a perspective view of the pad supporting frame.

Referring to the drawing 1 designates the metal frame, which consists of a cross bar 2, and having its ends integrally connected adjacent the ends of the bar 2 is a loop 3. The bar 2 and loops 3 are embedded in the pad 4, said pad being formed from suitable rubber. The bar 2 extends transversely of the pad 4, and has its outer ends terminating in vertical plates 5, which in turn terminate in plates 6, which are disposed horizontally and are provided with bolt openings 7, said plates 5 and 6 constituting clips, the purpose of which will appear later.

It will be noted that the loop 3 is embedded in that part of the pad which rests against the frog of the hoof, and serves to hold the pad stiff. The type of pad used is one which has a thickened portion 8, and a thinned portion 9, the edge of the thinned portion being adapted to engage between the hoof and usual metal shoe 10. The shoe is provided adjacent its heels with threaded sockets 11 for receiving the screws 12 which are passed through the openings 7 formed in the plate 6. Thus it will be seen that the clips aid in holding the pad in proper position in respect to the shoe.

From the foregoing description it will be seen that a pad has been provided which may be easily attached to or removed from the hoof of the animal.

What is claimed is:—

A horseshoe pad, in combination with a frame, said frame consisting of a cross bar, a loop carried by the cross bar, said bar having its ends terminating in clips, said frame being embedded in the pad, and having the clips projecting therefrom, said clips being adapted to engage the under surface of the shoe, bolts carried by the clips for engaging the shoe, as and for the purpose set forth.

In testimony whereof, I affix my signature, in the presence of two witnesses.

CHARLES R. CARR.

Witnesses:
GEO. L. McCLOUD,
M. G. BELL.

Copies of this patent may be obtained for five cents each, by addressing the "Commissioner of Patents, Washington, D. C."